United States Patent
Estrada et al.

(10) Patent No.: US 8,352,554 B2
(45) Date of Patent: Jan. 8, 2013

(54) SYSTEM AND METHOD FOR SHARING DATA

(75) Inventors: Miguel A. Estrada, Hollis, NH (US);
Douglas W. Conmy, Nashua, NH (US);
Christoph Josef Luecking, Brakel (DE);
Scott H. Prager, Stratham, NH (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 11/809,306

(22) Filed: May 31, 2007

(65) Prior Publication Data

US 2008/0301245 A1    Dec. 4, 2008

(51) Int. Cl.
*G06F 15/16*    (2006.01)

(52) U.S. Cl. .......................... 709/206; 709/204; 709/205

(58) Field of Classification Search ................. 709/204, 709/205, 206
See application file for complete search history.

(56) References Cited

U.S. PATENT DOCUMENTS

| | | | |
|---|---|---|---|
| 2003/0115271 A1 | 6/2003 | Weissman | |
| 2003/0131013 A1 | 7/2003 | Pope et al. | |
| 2003/0135565 A1* | 7/2003 | Estrada | 709/206 |
| 2003/0158855 A1 | 8/2003 | Farnham et al. | |
| 2004/0158607 A1 | 8/2004 | Coppinger et al. | |
| 2004/0243677 A1 | 12/2004 | Curbow et al. | |
| 2004/0261013 A1* | 12/2004 | Wynn et al. | 715/511 |
| 2005/0182773 A1 | 8/2005 | Feinsmith | |
| 2005/0235224 A1 | 10/2005 | Arend et al. | |
| 2006/0015387 A1 | 1/2006 | Moore et al. | |
| 2006/0026558 A1 | 2/2006 | Beringer et al. | |
| 2006/0168543 A1 | 7/2006 | Zaner-Godsey et al. | |
| 2007/0073871 A1* | 3/2007 | Adams et al. | 709/224 |
| 2009/0013043 A1* | 1/2009 | Tan | 709/205 |
| 2009/0100347 A1* | 4/2009 | Schemers et al. | 715/751 |

OTHER PUBLICATIONS

Smith, Managing personal and work email in the same box: overcoming the tensions through new metaphors, pp. 14, Interact Lab, COGS, University of Sussex, Brighton BN1 9QH, UK.

Harrison, Roles and Relationships for Unified Activity Management, 236-245, GROUP '05, Nov. 6-9, 2005, Sanibel Island, Florida, USA.

* cited by examiner

*Primary Examiner* — Liangche A Wang
*Assistant Examiner* — Cheikh Ndiaye
(74) *Attorney, Agent, or Firm* — Holland & Knight LLP; Brian J. Colandreo, Esq.; Michael T. Abramson, Esq

(57) ABSTRACT

A method and computer program product for defining an activity. One or more members of the activity are defined. At least one piece of content is associated with the activity, thus defining at least one associated piece of content that is accessible by at least a portion of the members of the activity. Associating at least one piece of content with the activity includes determining if the at least one piece of content is from a private source.

16 Claims, 4 Drawing Sheets

SYSTEM AND METHOD FOR SHARING DATA

TECHNICAL FIELD

This disclosure relates to data sharing and, more particularly, to systems and methods for sharing pieces of content amongst a group of people.

BACKGROUND

Most email systems today treat messages as private to the person or the group of people that have access to the email "inbox". Most of the time, this is an individual person and not a group of people. When an email is to be shared, it may be accomplished in a variety of ways.

The most common method to share email is to forward the email to be shared to other individuals. This action requires that the email client support the function to copy/duplicate the email message being shared into another email message and then uses the existing email infrastructure to "send' the message to multiple recipients.

Another common methodology is to copy the contents of the email onto the "clipboard" and then paste the email contents into a document (e.g., a word processing document) that can then be placed into a shared repository (e.g., a file folder that is accessible by multiple individuals).

Another method of sharing an email is to copy the contents of the email onto a shared space such as a wiki (e.g., a collaborative website that allows multiple visitors to add, remove, and edit content included within the website).

Unfortunately, none of the above-described methods allow the email message to be shared as a contextual unit that includes attachments. Further, when forwarding copies of an email message to multiple people, subsequent edits made to the email message by a recipient are not shared with the group unless the edited copy is again provided to each person to which the original message was forwarded.

SUMMARY OF DISCLOSURE

In a first implementation, a method includes defining an activity. One or more members of the activity are defined. At least one piece of content is associated with the activity, thus defining at least one associated piece of content that is accessible by at least a portion of the members of the activity. Associating at least one piece of content with the activity includes determining if the at least one piece of content is from a private One or more of the following features may be included. The at least one associated piece of content may include a plurality of associated pieces of content. The plurality of associated pieces of content may be organized in a hierarchical fashion.

Associating at least one piece of content with the activity may include, if it is determined that the at least one piece of content is not from the private source, defining a pointer that locates the at least one piece of content.

Associating at least one piece of content with the activity may include, if it is determined that the at least one piece of content is from the private source, determining if the at least one piece of content is copyable. Associating at least one piece of content with the activity may include, if it is determined that the at least one piece of content is not copyable, rendering a message that identifies the at least one piece of content as non-copyable. Associating at least one piece of content with the activity may include, if it is determined that the at least one piece of content is copyable, obtaining a copy of the at least one piece of content.

Obtaining a copy of the at least one piece of content may include requesting a stream of the at least one piece of content from the private source. The stream requested may be a MIME stream. Obtaining a copy of the at least one piece of content may include receiving the MIME stream of the at least one piece of content from the private source. The MIME stream may be a multi-part MIME stream. At least one part of the multi-part MIME stream may define a file attachment.

In another implementation, a computer program product resides on a computer readable medium and has a plurality of instructions stored on it. When executed by a processor, the plurality of instructions cause the processor to perform operations including defining an activity. One or more members of the activity are defined. At least one piece of content is associated with the activity, thus defining at least one associated piece of content that is accessible by at least a portion of the members of the activity. Associating at least one piece of content with the activity may include determining if the at least one piece of content is from a private source.

One or more of the following features may be included. The at least one associated piece of content may include a plurality of associated pieces of content. The plurality of associated pieces of content may be organized in a hierarchical fashion.

Associating at least one piece of content with the activity may include, if it is determined that the at least one piece of content is not from the private source, defining a pointer that locates the at least one piece of content.

Associating at least one piece of content with the activity may include, if it is determined that the at least one piece of content is from the private source, determining if the at least one piece of content is copyable. Associating at least one piece of content with the activity may include, if it is determined that the at least one piece of content is not copyable, rendering a message that identifies the at least one piece of content as non-copyable. Associating at least one piece of content with the activity may include, if it is determined that the at least one piece of content is copyable, obtaining a copy of the at least one piece of content.

Obtaining a copy of the at least one piece of content may include requesting a stream of the at least one piece of content from the private source. The stream requested may be a MIME stream. Obtaining a copy of the at least one piece of content may include receiving the MIME stream of the at least one piece of content from the private source. The MIME stream may be a multi-part MIME stream. At least one part of the multi-part MIME stream may define a file attachment.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
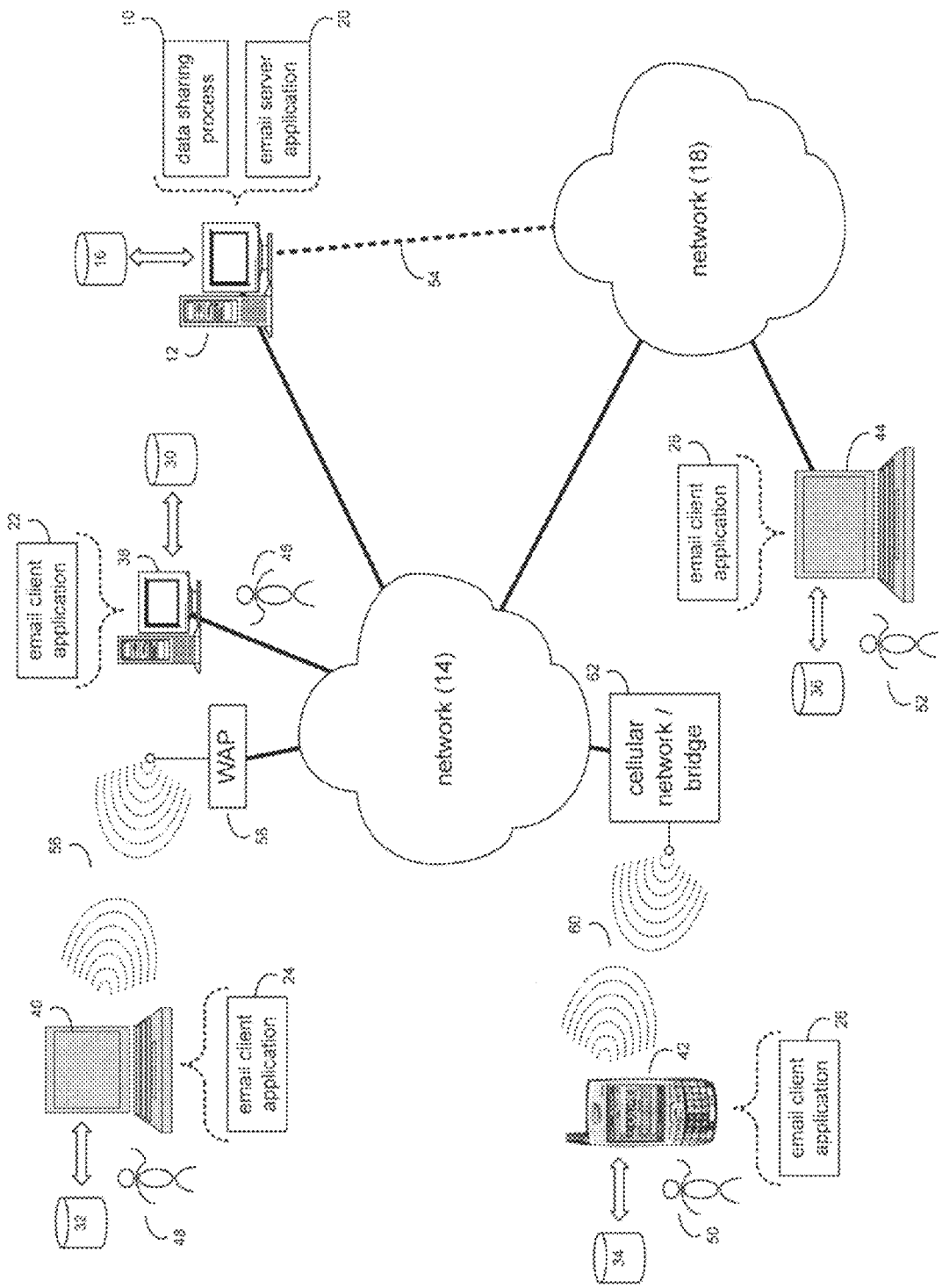
FIG. 1 is a diagrammatic view of a data sharing process and email client application coupled to a distributed computing network.

System Overview:

Referring to FIG. 1, there is shown data sharing process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. As will be discussed below in greater detail, data sharing process 10 may allow for the creation and sharing of one or more email activities, in which users may collaborate and share email correspondence amongst members of the email activity.

An activity may be a collaborative event in which multiple users collaborate to achieve a common goal. For example, an activity may concern the attendance of Company X at a tradeshow. Specifically, this activity may include a plurality of discrete tasks, such as securing booth space at the tradeshow so that Company X may exhibit their goods/services. Additionally, Company X may need to make travel arrangements, arrange for the shipping of booth backdrops, platforms and tables. Further, Company X may need to have signage created and may need to obtain trinkets for giving to visitors of their booth.

Accordingly, Company X attending a tradeshow may be an activity that include a plurality of discrete tasks. As would be expected, each of these discrete task may be performed by different individuals (or different groups of individuals). In order to increase efficiency, it may be desirable for each individual (or group of individuals) to know what the other individuals (or groups of individuals) are doing. For example, tradeshow attendees may need to know about the travel arrangements, and the individuals making the signage may need to know about the size of the booth secured.

The instruction sets and subroutines of data sharing process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute email server application 20, examples of which may include but are not limited to Lotus Domino™ Server and Microsoft Exchange™ Server. Mail server application 20 may be a mail transfer agent that may store and route email to one or more email client applications 22, 24, 26, 28, examples of which may include but are not limited to Lotus Notes™ and Microsoft Outlook™. Data sharing process 10 may be a stand alone application that interfaces with email server application 20 or an applet/application that is executed within email server application 20.

The instruction sets and subroutines of email server application 20, which may be stored on storage device 16 coupled to server computer 12 may be executed by one or more processors (not shown) and one or more memory architectures (not shown) incorporated into server computer 12.

The instruction sets and subroutines of email client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and a memory stick storage devices. Examples of computing devices 38, 40, 42, 44 may include, but are not limited to, personal computer 38, laptop computer 40, personal digital assistant 42. notebook computer 44, a data-enabled, cellular telephone (not shown), and a dedicated network device (not shown), for example. Using email client applications 22, 24, 26, 28, users 46, 48, 50, 52 may access email server application 20 and may retrieve and/or organize email messages.

Users 46, 48, 50, 52 may access email server application 20 directly through the device on which the email client application (e.g., email client applications 22, 24, 26, 28) is executed, namely client electronic devices 38, 40, 42, 44, for example. Users 46, 48, 50, 52 may access email server application 20 directly through network 14 or through secondary network 18. Further, server computer 12 (i.e., the computer that executes email server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

Figure 2:
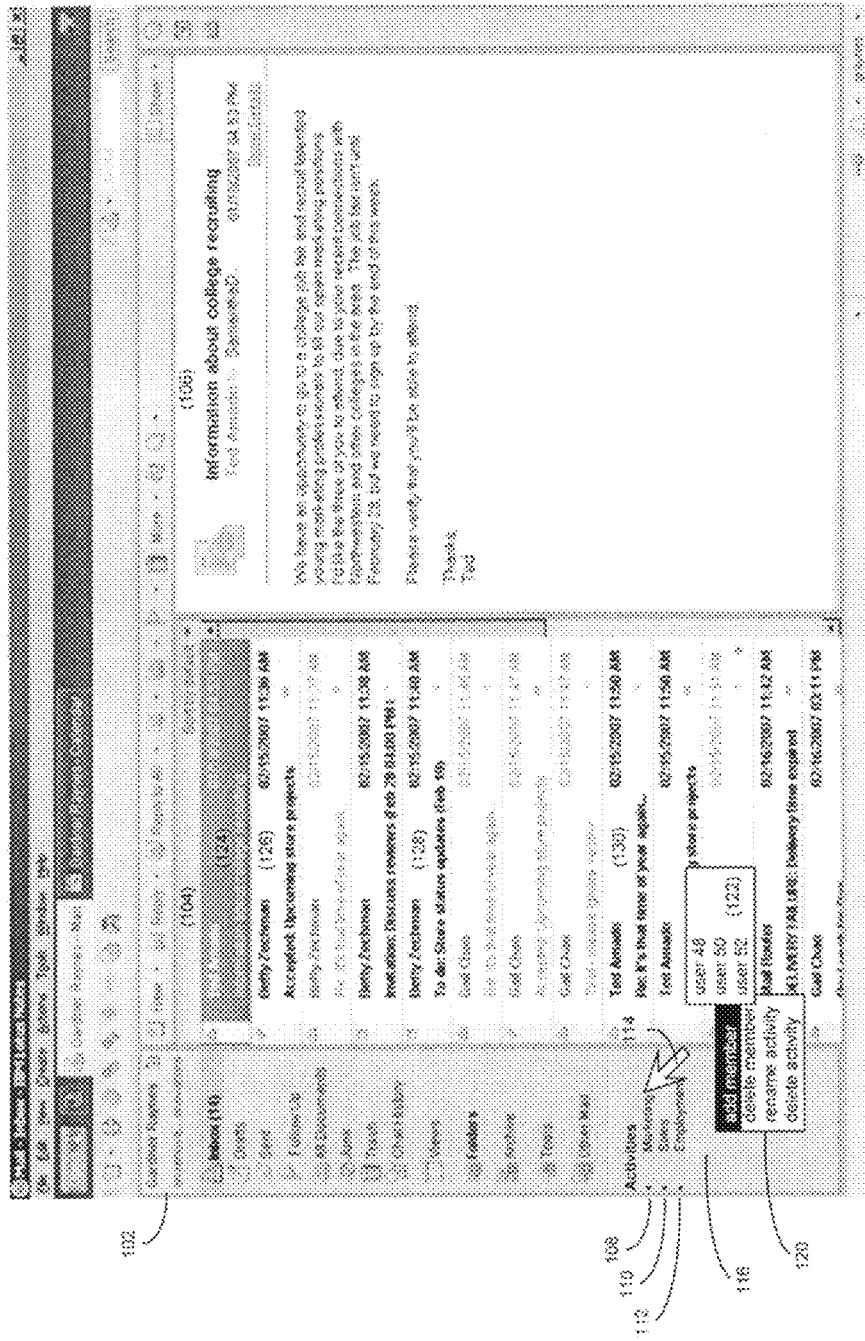
FIG. 2 is a diagrammatic view of a display screen rendered by the data sharing process and/or the email client application of FIG. 1.

The Data Sharing Process:

Referring also to FIG. 2, an email client application (e.g., email client application 22) may render display screen 100. As discussed above, the email client application (e.g., email client application 22) may interface with email server application 20 and facilitate access to and manipulation of the email messages available from email server application 20.

Display screen 100 may include a plurality of regions, such as navigation region 102 (which allows user 46 to choose between the various functionalities of email client application 22); detail region 104 (which provides a detail view of the functionality of the region selected in navigation region 102); and preview region 106 (which provides a preview window with respect to the item selected in detail region 104). For example, user 46 may select "Inbox" in navigation region 102, and detail region 104 may be populated with the contents of the "Inbox" selected in navigation region 102. Preview region 106 may illustrate the content of an individual email message selected in detail region 104.

Figure 3:
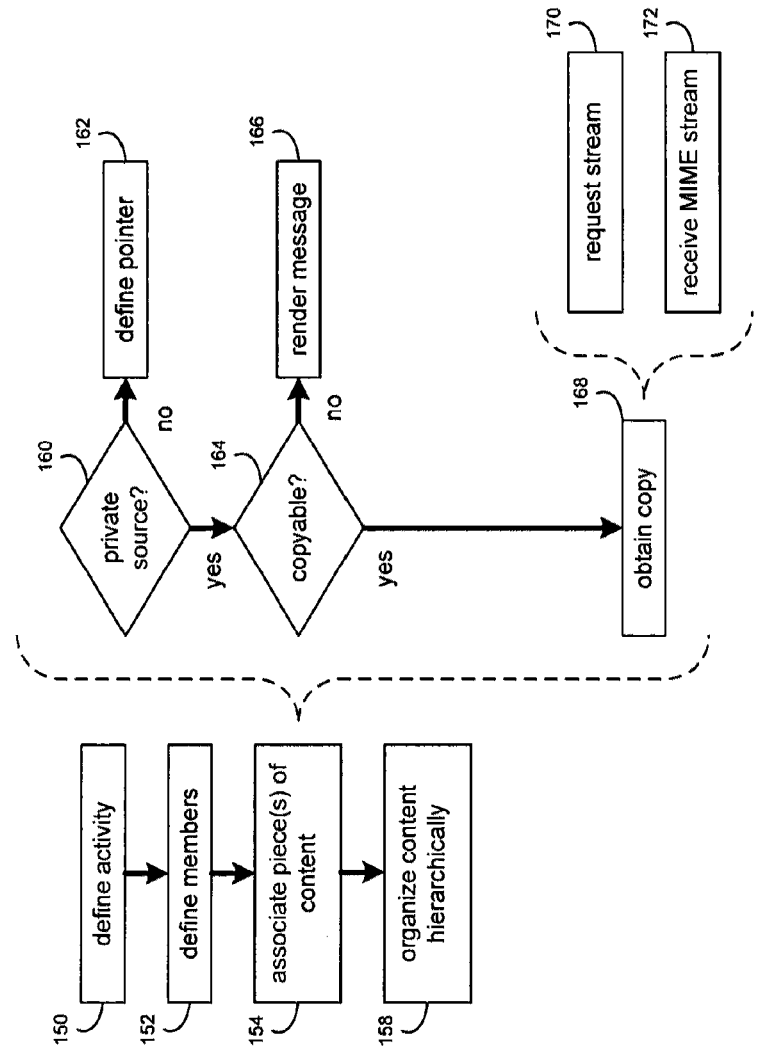
FIG. 3 is a flowchart of a process executed by the data sharing process of FIG. 1.

Referring also to FIG. 3, data sharing process 10 may allow a user to define 150 one or more email activities 108, 110, 112. Data sharing process 10 may also allow the user to define 152 one or more members for an email activity. Once the email activity is defined 150, the user may be allowed to associate 154 one or more email messages with the email activity, thus defining one or more email messages that may be accessible by at least a portion of the members of the email activity.

For example, user 46 may define 150 an email activity (e.g., "Marketing" email activity 108) through which email messages and their respective attachments may be shared amongst multiple users. "Marketing" email activity 108 may be defined 150 in various ways. For example, user 46 may simply drag (using onscreen pointer 114 that is controllable by a pointing device, not shown) an email message from e.g., either detail region 104 or preview region 106 into unoccupied activity zone 116 and a new activity may be defined 150. Data sharing process 10 may prompt user 46 for a name for the newly-created activity. Alternatively, data sharing process 10 may assign a default name (e.g., "New Activity") to the newly-created activity, which may be subsequently renamed by user 46.

Once an email activity (e.g., "Marketing" email activity 108) is defined 150, user 46 may define 152 one or more member for the activity. For example, user 46 may position onscreen pointer 114 above the newly-created "Marketing" email activity 108 and may "right-click" the pointing device (e.g., a mouse; not shown) controlling onscreen pointer 114 and data sharing process 10 may render popup menu 120. Popup menu 120 may define a plurality of options available to user 46, examples of which may include but are not limited to "add member", "delete member", "rename activity" and "delete activity". User 46 may select (using onscreen pointer 114) the "add member" option, resulting in e.g., data sharing process 10 rendering popup submenu 122 that may itemize the users that are available for membership. For example, in the particular embodiment shown in FIG. 1, four users are defined, namely users 46, 48, 50, 52. As, in this example, user 46 is creating the activity, the users available for membership may include users 48, 50, 52. Alternatively, popup submenu 122 may define user 46, thus requiring user 46 to select himself as a member of "Marketing" email activity 108.

Through the use of popup submenu 122, user 46 may define 152 members for inclusion in "Marketing" email activity 108. Assume for illustrative purposes that user 46 selects only users 50, 52 (i.e., does not select user 48). Therefore, "Marketing" email activity 108 may only appear within the navigation region 102 of email client applications 22, 26, 28 (i.e., the email client applications associated with user 46, 50, 52 respectively) and may not appear within the navigation region 102 of email client application 24 (i.e., the email client application associated with user 48). Alternatively, "Marketing" email activity 108 may appear within the navigation region 102 of email client application 24 (i.e., the email client application associated with user 48), but "Marketing" email activity 108 may not be accessible by user 48 (e.g., "Marketing" email activity 108 may be "grayed" out).

Users 46, 50, 52 (i.e., the members of "Marketing" email activity 108) may be divided into a plurality groups, examples of which may include but are not limited to "Readers", "Authors", and "Owners". Each group may have different rights and/or privileges with respect to e.g., "Marketing" email activity 108. For example, "Readers" may only be allowed to read email messages associated 154 with "Marketing" email activity 108; "Authors" may only be allowed to read and/or write email messages associated 154 with "Marketing" email activity 108; and "Owners" may be allowed to read and/or write email messages associated 154 with "Marketing" email activity 108 and may be allowed to configure email activities. Accordingly, when defining 152 members for inclusion within "Marketing" email activity 108, user 46 may be required to define the level of rights (e.g., "Reader", "Author", or "Owner") associated with the membership.

Continuing with the above-stated example, assume that user 46 associates 154 email messages 124, 126, 128, 130 with "Marketing" email activity 108. User 46 may associate these email messages with "Marketing" email activity 108 by dragging a copy of email messages 124, 126, 128, 130 from e.g., either detail region 104 or preview region 106 onto "Marketing" email activity 108 using onscreen pointer 114.

When associating email messages with "Marketing" email activity 108, data sharing process 10 may examine the various fields of the email message and if a user that is not a member of e.g., "Marketing" email activity 108 is defined within e.g., the "To", "From", or "CC" fields of the email message, user 46 (i.e., the user associating the email messages with "Marketing" email activity 108) may be presented with the option of defining 152 the non-member user as a member of "Marketing" email activity 108. For example, if user 46 is associating 154 email message 130 that is received from user 48 (who is not a member of "Marketing" email activity 108, user 46 may be asked if they want to define 152 user 48 as a member of "Marketing" email activity 108.

Figure 4:
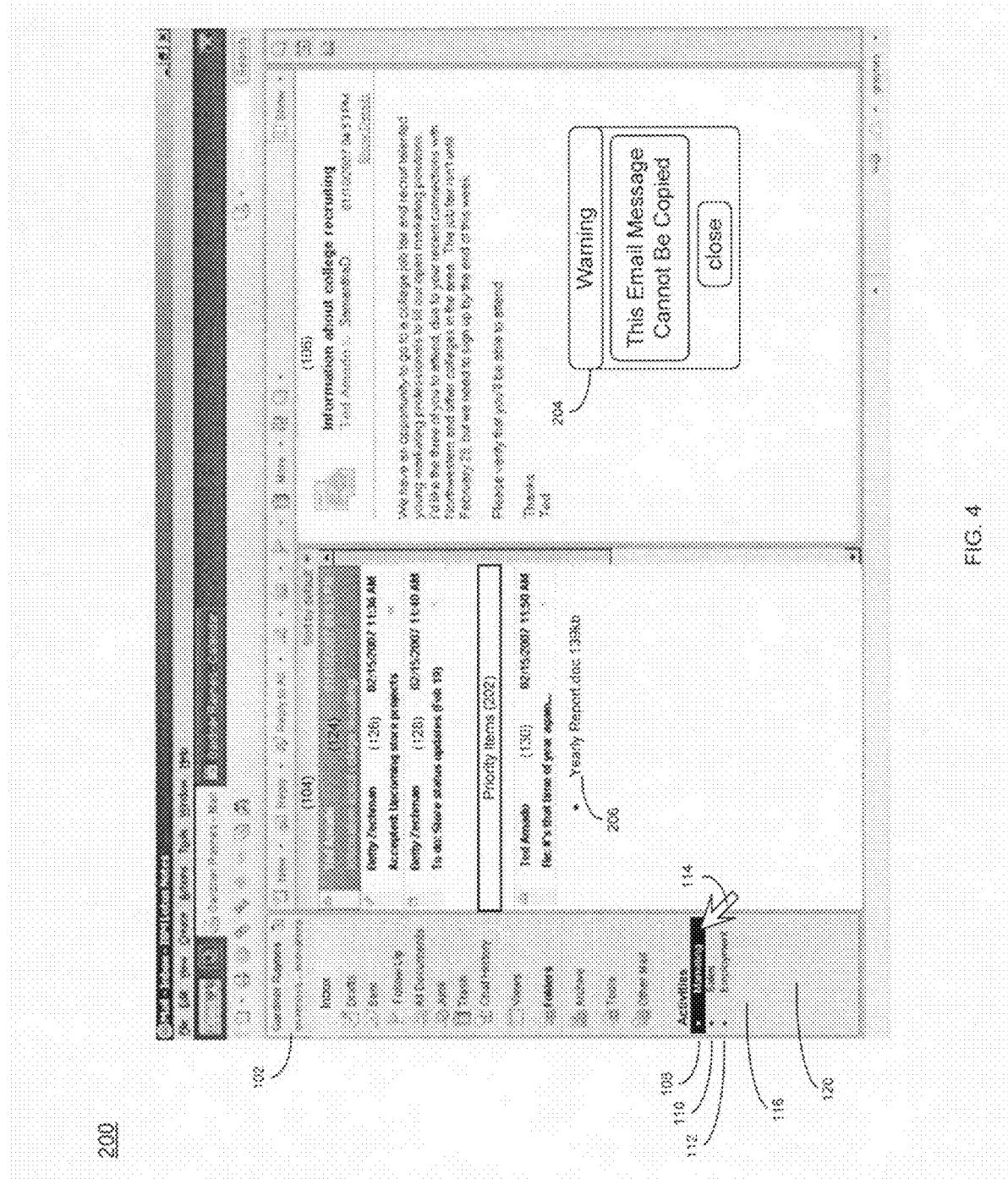
FIG. 4 is a diagrammatic view of a display screen rendered by the data sharing process and/or the email client application of FIG. 1.

Referring also to FIG. 4, once email messages 124, 126, 128, 130 are associated 154 with "Marketing" email activity 108 and upon selecting "Marketing" email activity 108 using e.g., onscreen pointer 114, email client application 22 may render display screen 200, which may define the email messages associated 154 with "Marketing" email activity 108.

While the email messages are shown in display screen 200 to be organized in a chronological fashion, other configurations are possible. For example, the individual email messages may be organized 158 in a hierarchical fashion. Specifically, a first email message may be positioned as a subset of another email message. For example, email messages may be grouped based up subject. Additionally/alternatively, user 46 may define one or more groups (e.g., "Priority Items" group 202) under which email message may be organized. Further, user 46 may define subgroups for further organization within a group.

As discussed above, each of the email messages (e.g., email messages 124, 126, 128, 130) may be accessible by the members of "Marketing" email activity 108, as defined 152 by user 46. As further discussed above and in this example, the members associated 152 with "Marketing" email activity 108 include users 46, 50, 52, each of which may be defined as a "Reader", an "Author", or an "Owner".

When associating 154 email messages (e.g., e.g., email messages 124, 126, 128, 130) with an email activity (e.g., "Marketing" email activity 108), data sharing process 10 may determine the location of the email message (and any email attachment(s)) and the manner in which the email message (and any email attachment(s)) are stored. For example, data sharing process 10 may examine each email message to determine the best way to include the email message (and any attachments) within the email activity (e.g., as either a link to a remote email message or as a copy of the email message). Accordingly, data sharing process 10 may determine 160 if the email message to be associated 154 with the email activity is from a private source. An example of such a private source may include, but is not limited to, a private email account. For example, as email accounts are typically private and require e.g., a username and a password to be accessed, it may be impossible to obtain (at a later date) a copy of an email message stored within a private email account without having access to the username/password associated with the email account. Accordingly, if data sharing process 10 determines 160 that the email message to be associated 154 with email activity 108 is not from a private source (e.g., is from a public source), data sharing process 10 may define 162 (within "Marketing" email activity) a pointer that points to the remotely-stored email message that is stored on a public source.

However, if data sharing process 10 determines 160 that the email message to be associated 154 with email activity 108 is from a private source (e.g., a password protected email account), a pointer to the remotely-stored email message may not achieve the desired result (i.e., multi-user access to the email associated 154 with "Marketing" email activity 108). For example, assume that the email account of user 46 is a password-protected email account and further assume that user 46 wishes to share email message 130 (which was received in the password-protected email account of user 46) with the members of "Marketing" email activity 108. If data sharing process 10 simply defined 162 a pointer to the above-stated email message, upon e.g., user 50 trying to access email message 130 through "Marketing" email activity 108, user 50 would not be able to access the email message unless user 50 knew the username/password of user 46.

Accordingly, if data sharing process 10 determines 160 that the email message (e.g., email message 130) to be associated 154 with "Marketing" email activity 108 is from a private source, data sharing process 10 may determine 164 if the email message is copyable. If it is determined that the email message 130 is not copyable, data sharing process 10 may render an error message that identifies e.g., email message 130 as non-copyable. An example of such a message is illustrated in FIG. 4 as popup window 204.

If it is determined 164 that email message 130 is copyable, data sharing process 10 may obtain 168 a copy of email message 130, which may be stored within a location that is accessible to members of "Marketing" email activity 108. An example of such a location may include, but is not limited to, storage device 16 that is coupled to server computer 12. When obtaining 168 a copy of the copyable email message (e.g., email message 130), data sharing process 10 may request 170 a stream of the copyable email message from the source that is currently storing the copyable email message. For example, assume that user 46 wishes to obtain a copy of email message 130 for sharing with members 50, 52 of "Marketing" email activity 108. Data sharing process 10 may request a stream of email message 130 from email server application 20 and email server application 20 may provide the stream. An example of such a stream is a Multipurpose Internet Mail Extensions (MIME) stream, which may be a multi-part stream in which e.g., one part represents the email message and another part represents an attachment (e.g., a file) attached to the email message. As is know in the art, MIME is an internet standard that extends the format of an email message to support various features, examples of which may include but are not limited to: text in character sets other than US-ASCII; non-text attachments; multi-part message bodies; and header information in non-ASCII character sets.

Obtaining 168 a copy of email message 130 may include receiving 172 the MIME stream of email message 130 (and any attachments) from the private source (e.g., the password protected email account of user 46). The MIME stream received 172 may be a multi-part MIME stream, in which at least one part of the multi-part MIME stream defines a file attached to email message 130. For example and for illustrative purposes, email message 130 is shown to include a one-hundred-thirty-nine kilobyte attachment 206 entitled "Yearly Report.doc". Attachment 206 may be organized in a hierarchical fashion within "Marketing" email activity 108, in that attachment 206 may be positioned as a subset of email message 130, which may be positioned as a subset of "Priority Items" group 202.

While data sharing process 10 is described above as allowing for the creation and sharing of one or more email activities in which users collaborate and share email correspondence amongst members of the email activity, other configurations are possible and are considered to be within the scope of this disclosure. For example and for illustrative purposes, users may create other types of email activities and may collaborate and share other types of content amongst members of the activity. Examples of such types of content may include but are not limited to medical records, tax records, calendar entries within a scheduling program, and corporate financial reports.

A number of implementations have been described. Nevertheless, it will be understood that various modifications may be made. Accordingly, other implementations are within the scope of the following claims.

What is claimed is:

1. A method comprising:
   in response to dragging a first email message into an unoccupied activity zone of an email application, defining an activity in the email application, wherein the activity includes an email activity;
   defining one or more members of the activity;
   associating at least one piece of content with the activity, thus defining at least one associated piece of content that is accessible by at least a portion of the members of the activity;
   determining if the at least one piece of content is from a private source and copyable, the at least one piece of content inaccessible by the one or more members of the activity directly from the private source;
   requesting a stream of the at least one piece of content from the private source wherein the private source is an email server application;
   obtaining a copy of the at least one piece of content if the at least one piece of content is from the private source and copyable;
   storing the copy of the at least one piece of content at a location configured to be accessible to the one or more members of the activity if the at least one piece of content is from the private source and copyable;

defining a pointer that locates the at least one piece of content, if the at least one piece of content is not from the private source;

determining if a user that is not a member of the activity is included in a field of a second email message, wherein the second email message is associated with the activity; and in response to determining that the user is not a member of the activity, presenting in a pop-up message an option to define the user as a member of the activity.

2. The method of claim 1 wherein the at least one associated piece of content includes a plurality of associated pieces of content, the method further comprising:

organizing the plurality of associated pieces of content in a hierarchical fashion.

3. The method of claim 1 wherein associating at least one piece of content with the activity includes:

in response to determining that the at least one piece of content is not copyable, rendering a message that identifies the at least one piece of content as non-copyable.

4. The method of claim 1 wherein the stream requested is a MIME stream and wherein obtaining a copy of the at least one piece of content includes:

receiving the MIME stream of the at least one piece of content from the private source.

5. The method of claim 4 wherein the MIME stream is a multi-part MIME stream and at least one part of the multi-part MIME stream defines a file attachment.

6. A computer program product residing on a non-transitory computer readable medium having a plurality of instructions stored thereon which, when executed by a processor, cause the processor to perform operations comprising:

in response to dragging a first email message into an unoccupied activity zone of an email application, defining an activity in the email application, wherein the activity includes an email activity;

defining one or more members of the activity;

associating at least one piece of content with the activity, thus defining at least one associated piece of content that is accessible by at least a portion of the members of the activity;

determining if the at least one piece of content is from a private source and copyable, the at least one piece of content inaccessible by the one or more members of the activity directly from the private source;

requesting a stream of the at least one piece of content from the private source wherein the private source is an email server application;

obtaining a copy of the at least one piece of content if the at least one piece of content is from the private source and copyable;

storing the copy of the at least one piece of content at a location configured to be accessible to the one or more members of the activity if the at least one piece of content is from the private source and copyable;

defining a pointer that locates the at least one piece of content, if the at least one piece of content is not from the private source; and determining if a user that is not a member of the activity is included in a field of a second email message, wherein the second email message is associated with the activity; and in response to determining that the user is not a member of the activity, presenting in a pop-up message an option to define the user as a member of the activity.

7. The computer program product of claim 6 wherein the at least one associated piece of content includes a plurality of associated pieces of content, the computer program product further comprising instructions for:

organizing the plurality of associated pieces of content in a hierarchical fashion.

8. The computer program product of claim 6 wherein the instructions for associating at least one piece of content with the activity include instructions for:

in response to determining that the at least one piece of content is not copyable, rendering a message that identifies the at least one piece of content as non-copyable.

9. The computer program product of claim 6 wherein the stream requested is a MIME stream and wherein the instructions for obtaining a copy of the at least one piece of content include instructions for:

receiving the MIME stream of the at least one piece of content from the private source.

10. The computer program product of claim 9 wherein the MIME stream is a multi-part MIME stream and at least one part of the multi-part MIME stream defines a file attachment of the at least one piece of content.

11. The method of claim 2 wherein the plurality of associated pieces of content includes:

email correspondence, medical records, tax records, calendar entries within a scheduling program, and corporate financial reports.

12. The computer program product of claim 7 wherein the plurality of associated pieces of content includes:

email correspondence, medical records, tax records, calendar entries within a scheduling program, and corporate financial reports.

13. The method of claim 1 wherein the private source requires at least one of a username and a password to permit the one or more members of the activity access to the at least one piece of content.

14. The computer program product of claim 6 wherein the private source requires at least one of a username and a password to permit the one or more members of the activity access to the at least one piece of content.

15. The method of claim 1 wherein the pointer points to a remotely-stored email message stored on a public source.

16. The computer program product of claim 6 wherein the pointer points to a remotely-stored email message stored on a public source.

* * * * *